US005219000A

United States Patent [19]

Chalasani et al.

[11] Patent Number: 5,219,000

[45] Date of Patent: Jun. 15, 1993

[54] FLUID PRESSURE ACCUMULATOR

[75] Inventors: Rao M. Chalasani, Troy; Kim P. Lind, Brighton, both of Mich.; James L. Lopez, Jr., Dayton, Ohio; Shawn W. Ryan, Southfield, Mich.; Bernard Burns, Warren, Mich.; Richard A. Gdowski, Mt. Clemens, Mich.; Ralph C. Pinson, Southfield, Mich.; Clyde A. Bowers, Southfield, Mich.

[73] Assignee: General Motors Corporation, Detroit, Mich.

[21] Appl. No.: 891,077

[22] Filed: May 29, 1992

[51] Int. Cl.[5] .......... F16L 55/04

[52] U.S. Cl. .......... 138/31; 138/26; 417/540

[58] Field of Search .......... 138/26, 30, 31; 220/241; 417/540

[56] References Cited

U.S. PATENT DOCUMENTS

| | | | |
|---|---|---|---|
| 2,546,055 | 3/1951 | Ballard | 138/32 |
| 2,828,760 | 4/1958 | Taylor et al. | 138/31 |
| 3,198,213 | 8/1965 | Schindel | 138/31 |
| 3,288,168 | 11/1966 | Mercier et al. | 138/30 |
| 3,509,916 | 5/1970 | Mercier | 138/30 |
| 3,893,486 | 7/1975 | Meyers | 138/31 |
| 4,878,519 | 11/1989 | Berding et al. | 138/31 |

*Primary Examiner*—James E. Bryant, III
*Attorney, Agent, or Firm*—Saul Schwartz

[57] ABSTRACT

An economical to manufacture and simple to install and remove gas charged fluid pressure accumulator including a cup-shaped accumulator body with an integral dome at one end and an integral in-turned annular lip at the other end, a piston slidably disposed in the accumulator body, and an external screw thread on the accumulator body. The accumulator body is screwed into a threaded counterbore until the annular lip bears against a bottom wall of the counterbore with a fluid port of the manifold inside of the projection of the lip on the bottom wall. A seal ring in a groove in the bottom wall of the counterbore bears against the annular lip to seal the chamber of the accumulator defined between the bottom wall and the piston.

3 Claims, 1 Drawing Sheet

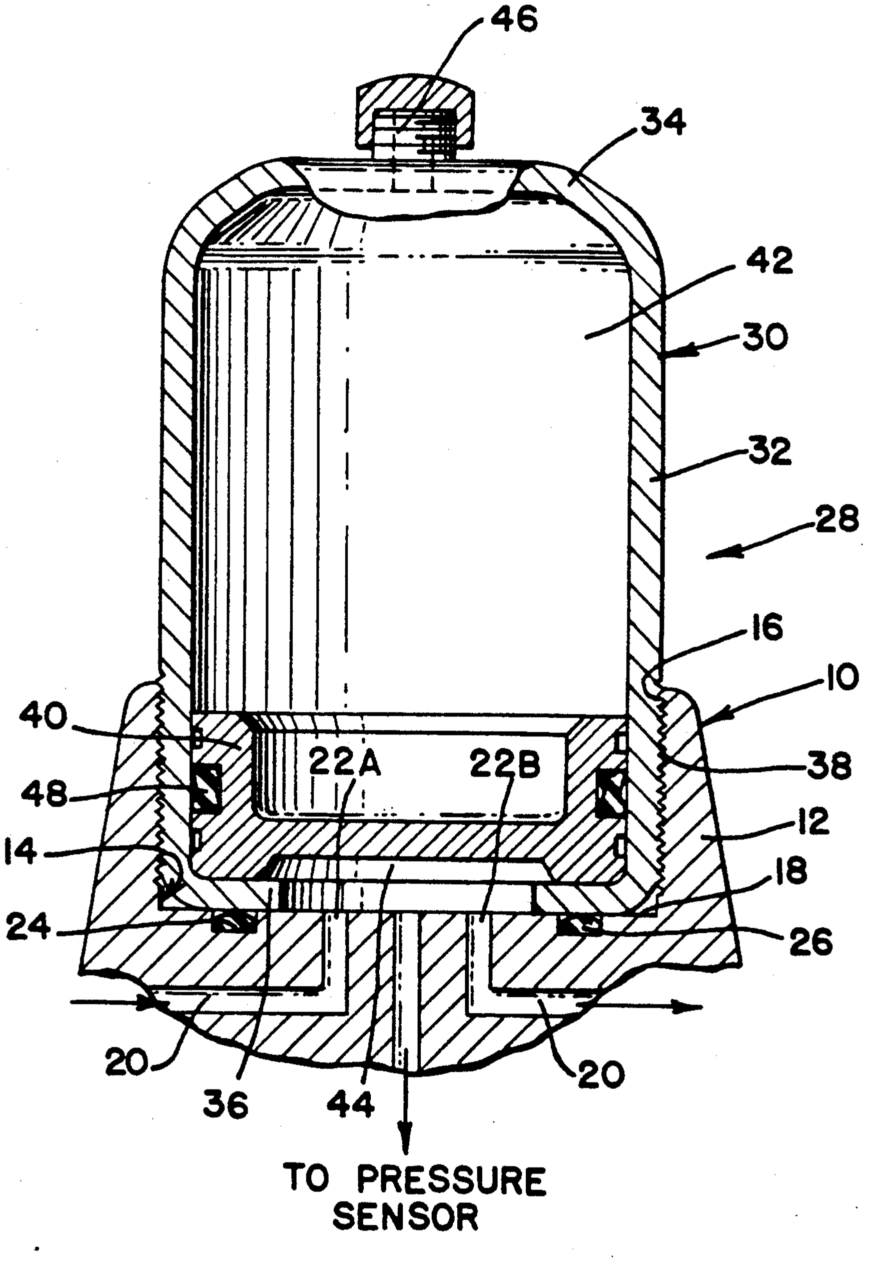
46
34
42
30
32
28
16
10
40
22A
22B
38
48
12
14
18
24
26
20
20
36
44
TO PRESSURE
SENSOR

FLUID PRESSURE ACCUMULATOR

FIELD OF THE INVENTION

This invention relates to gas charged fluid pressure accumulators for hydraulic systems.

BACKGROUND OF THE INVENTION

Typical gas charged fluid pressure accumulators include a cylindrical housing closed at opposite ends and a piston dividing the interior of the housing into a gas pressure chamber and a fluid pressure chamber. The gas pressure chamber is charged to a predetermined pressure and the fluid pressure chamber is connected to a hydraulic circuit. The accumulator attenuates pressure pulses in the hydraulic circuit through stroking of the piston against resilient resistance of the gas in the gas pressure chamber. Because gas charged fluid pressure accumulators are not mass produced, i.e. are not produced in multiple millions of units per year, nor typically used in systems where they are often replaced, they are not usually designed for minimum manufacturing cost and maximum installation and removal simplicity. A gas charged fluid pressure accumulator according to this invention embodies novel features for economical manufacture and for maximum ease of installation and removal and is particularly suited for motor vehicle active suspension system applications.

SUMMARY OF THE INVENTION

This invention is a new and improved gas charged fluid pressure accumulator including a cup-shaped accumulator body having a cylindrical side wall and an integral closure or dome. A piston is slidably disposed inside the accumulator body and is captured by an integral annular retaining lip around the open end of the cylindrical side wall. The retaining lip is bent inward after the piston is installed and is disposed in a plane perpendicular to the longitudinal centerline of the accumulator body. A first chamber of the accumulator between the piston and the dome is charged with gas under pressure which biases the piston toward the retaining lip. External screw threads are formed on the cylindrical side wall of the accumulator body near the retaining lip. Corresponding internal screw threads are formed on a wall of a counterbore in a fluid manifold. A fluid port is located in the bottom of the counterbore in the fluid manifold and a seal ring is disposed in a circular groove in the bottom wall around the fluid port. The diameter of the seal ring groove corresponds to the diameter of the retaining lip of the accumulator body. When the accumulator body is threaded into the counterbore, the bottom of the counterbore cooperates with the accumulator piston in defining a second chamber of the accumulator open to the fluid port in the bottom of the counterbore. The second chamber is fluid sealed by the seal ring which bears against the retaining lip when the accumulator body is threaded fully into the counterbore in the fluid manifold.

BRIEF DESCRIPTION OF THE DRAWING

The single drawing figure illustrates a gas charged fluid pressure accumulator according to this invention.

DESCRIPTION OF A PREFERRED EMBODIMENT

Referring to the single drawing figure, a schematically represented fluid manifold (10) includes a manifold body (12) having a cylindrical counterbore (14) therein. The counterbore (14) is internally threaded from an open end (16) to near a circular bottom wall (18) of the counterbore. A fluid passage (20) in the manifold body intersects the bottom wall (18) at a pair of fluid ports (22A–B). The fluid ports are located inside a circular seal ring groove (24) in the bottom wall in which is disposed an elastomeric seal ring (26). A gas charged fluid pressure accumulator (28) according to this invention is disposed in the counterbore (14).

The accumulator (28) includes a generally cup-shaped accumulator body (30), preferably made of carbon steel, having a cylindrical side wall (32) with an integral closure or dome (34) at one end and an integral annular lip (36) at the other end. The diameter of the lip (36) is about equal to the diameter of the seal ring groove (24). The side wall has an external screw thread (38) thereon near the lip (36) which engages the threaded wall of the counterbore (14) when the accumulator body is screwed into the counterbore. The annular lip is disposed in a plane perpendicular to the longitudinal centerline of the side wall (32) and bears against the seal ring (26) when the accumulator body is threaded fully into the counterbore (14). The fluid ports (22A–B) are disposed inside of the ring defined by the projection of the annular lip (36) on the bottom wall (18) of the counterbore.

A piston (40), preferably made of aluminum, is slidably disposed inside the accumulator body (30). The piston cooperates with the dome (34) in defining a first variable volume chamber (42) of the accumulator and with the bottom wall (18) of the counterbore (14) in defining a second variable volume chamber (44) of the accumulator. The first chamber (42) is charged with gas under pressure through a schematically represented gas charging port (46). The second chamber (44) is open to the fluid passage (20) through the ports (22A–B) and is sealed against leakage around the outside of the accumulator body by engagement of the seal ring (26) on the lip (36). A seal ring (48) on the piston prevents fluid and/or gas leakage between the first and second chambers.

The simple construction of the accumulator (28) is an important feature of this invention because it contributes to manufacturing economy. For example, manufacturing processes for drawing flat rolled steel into the cup-shaped accumulator body (30) or for extruding similar shapes are well developed. The piston (40) is assembled into the accumulator body before the end of the latter is bent inward to define the lip (36), another relatively simple and well developed manufacturing operation. Further, the external screw thread (38) on the accumulator body is easily made by thread rolling or other well developed process and installation and removal of the accumulator body by threading into and out of the counterbore is simple.

The accumulator (28) operates in conventional fashion to attenuate pressure pulses in the fluid passage (20). For example, in motor vehicle active suspension system application, it is contemplated that an upstream end of the passage (20) is connected to a high pressure pump and a downstream end to a wheel suspension device. By virtue of the fluid ports (22A–B) in the bottom wall of the counterbore, the second chamber (44) of the accumulator is interposed between the pump and the suspension device.

The initial gas pressure in the first chamber (42) is calculated to be below the average fluid pressure in the passage (20) so that the piston normally assumes a position about in the center of the accumulator body. From there, the piston oscillates up and down against the resilient resistance of the gas in the first chamber to attenuate fluid pressure pulses in the second chamber.

Engagement of the lip (36) on the bottom wall (18) of the counterbore (14) is also an important feature of this invention because it reinforces the lip against distortion out of its plane perpendicular to the longitudinal centerline of the side wall (32). In the active suspension system environment, for example, when the pump is off and fluid pressure in the second chamber (44) is zero, the piston (40) is biased by gas pressure in the first chamber (42) directly against the lip. Without reinforcement, the high gas pressure in the first chamber (42), on the order of about 2800 psi, could distort the lip (36). The bottom wall (18) of the counterbore (14), however, reinforces the lip from the outside so that even under sustained periods of zero fluid pressure in the second chamber (44), the lip (36) retains its shape and its sealing engagement with the seal ring (26).

We claim:

1. On a fluid manifold body, a gas charged fluid pressure accumulator comprising:

means on said manifold body defining a counterbore having a bottom wall, means defining a fluid pressure port in said bottom wall, a cup-shaped accumulator body having a side wall and an integral dome at a first end of said side wall and an in-turned integral annular lip at a second end disposed in a plane perpendicular to a longitudinal centerline of said side wall, a piston slidably disposed in said accumulator body and cooperating with said dome in defining a first variable volume chamber in said accumulator body, means for gas charging said first variable volume chamber to bias said piston toward said annular lip, means removably mounting said accumulator body in said counterbore with said fluid port located inside of a ring on said bottom wall of said counterbore generated by the generatrix of the terminal end of said annular lip so that said bottom wall cooperates with said piston in defining a second variable volume chamber in said accumulator body open to said fluid port, and seal means between said annular lip and said manifold body defining a fluid seal between said second variable volume chamber and said manifold body.

2. The gas charged fluid pressure accumulator recited in claim 1 wherein said means removably mounting said accumulator body in said counterbore with said fluid port located inside said ring on said bottom wall of said counterbore includes:

means defining an internal screw thread on a cylindrical wall of said counterbore, and means defining a corresponding external screw thread on said accumulator body.

3. The gas charged fluid pressure accumulator recited in claim 2 wherein said seal means between said annular lip and said manifold body includes:

means defining a circular groove in said bottom wall of said counterbore, and an elastomeric seal ring in said groove bearing against said annular lip on said accumulator body when said accumulator body is fully threaded into said counterbore.

* * * * *